UNITED STATES PATENT OFFICE 2,682,538

PENICILLIN SALT OF α-PHENYL-β-MORPHOLINOETHYL α-CHLOROACETATE

Frank H. Buckwalter, De Witt, and Alphonse P. Granatek, Syracuse, N. Y., assignors to Bristol Laboratories Inc., Syracuse, N. Y., a corporation of New York No Drawing. Application March 13, 1952,
Serial No. 276,453

4 Claims. (Cl. 260—239.1)

The present invention relates to a new, non-toxic, water-insoluble, amine salt of penicillin, more particularly a penicillin salt of alpha-phenyl-beta-morpholinoethyl alpha-chloroacetate, which is capable of exerting a repository antibiotic action and is also useful for oral, therapeutic administration and for external application and for use as a supplement in animal and poultry feeds.

The new penicillin salt of the present invention has the following formula

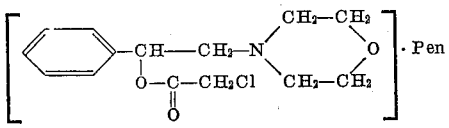

wherein Pen designates an acid penicillin radical or an active moiety thereof, capable of forming an addition salt with alpha-phenyl-beta-morpholinoethyl alpha-chloroacetate.

The product of the present invention may be obtained by reaction of penicillin acid with α-phenyl-β-morpholinoethyl α-chloroacetate, in a water-immiscible organic solvent and by the metathetical reaction of a water-soluble penicillin salt and a water-soluble salt of α-phenyl-β-morpholinoethyl α-chloroacetate in water.

A more comprehensive understanding of this invention is obtained by reference to the following examples.

EXAMPLE I

*Alpha-phenyl-beta-morpholinoethyl alpha-chloroacetate hydrochloride*

To a boiling solution of 20.7 g. (0.1 mole) of α-phenyl-β-morpholinoethanol in 150 cc. of benzene is added as rapidly as possible 12.6 g. (0.11 mole) of chloroacetyl chloride. The mixture is refluxed for one hour and cooled. Ether (250 cc.) is added. The colorless crystals of α-phenyl-β-morpholinoethyl α-chloroacetate hydrochloride are collected by filtration, recrystallized from a mixture of isopropyl alcohol and Skellysolve A (an industrial petroleum naphtha solvent( and found to melt at about 168°–170.5° C.

*Analysis.*—Calculated for $C_{14}H_{19}Cl_2NO_3$: C, 52.51; H, 5.98; N, 4.37. Found: C, 52.55; H, 6.08; N, 4.47.

The compound is very soluble in water and alcohols, moderately soluble in ketones and relatively insoluble in ether and petroleum ether.

EXAMPLE II

*Salt of penicillin G and alpha-phenyl-beta-morpholinoethyl alpha-chloroacetate*

Alpha - phenyl - beta - morpholinoethyl alpha-chloroacetate hydrochloride (0.87 gram) in 5.0 cc. of water is added to a solution of 1.0 gram of sodium penicillin G in 30 cc. water. Upon cooling and scratching, the crystalline salt of penicillin G and α-phenyl-β-morpholinoethyl α-chloroacetate precipitates and is collected by filtration. This salt has a potency of about 950 units/mgm. and is soluble in water at room temperature to the extent of about 250 units/cc.

EXAMPLE III

Potassium penicillin G (18.6 g.; 0.05 mole) is shaken with 75 ml. of 8.5% phosphoric acid and 150 ml. of ether in the cold until two clear layers result. The aqueous layer is withdrawn and discarded. The ether solution is filtered and then added all at once to a cold solution of 0.04 mole (11 grams) of freshly liberated α-phenyl-β-morpholinoethyl α-chloroacetate in 50 ml. of ether. Crystalline penicillin G salt of α-phenyl-β-morpholinoethyl alpha-chloroacetate precipitates and is collected by filtration.

While the present invention has been described with particular reference to the α-phenyl-β-morpholinoethyl α-chloroacetate salt of penicillin G it will be understood that the α-phenyl-β-morpholinoethyl α-chloroacetate salts of other penicillins are also included within the scope of this invention. For instance, penicillins such as the penicillins G, F, X, dihydro F, O and K and mixtures of two or more such penicillins, particularly such mixtures containing at least 85% of penicillin G, are included within the scope of this invention.

It will be understood that the reaction can be carried out in water-immiscible organic solvents other than ether. Examples of such solvents are butanol, amyl acetate, methyl amyl acetate, isopropyl ether, mesityl oxide, methyl isobutyl ketone, methylene dichloride, ethylene dichloride and chloroform. Recovery of the product may be increased by evaporating the solvent in vacuo at low temperatures.

It will be understood also that the ethereal solution of the free base may be prepared in ether by the use of caustic to liberate the free amine from an organic-solvent soluble or water soluble salt such as the hydrochloride phosphate, nitrate, hydrobromide, sulfate, citrate, acetate and tartrate.

It will be understood that, without departing from the spirit of the invention or the scope of the claims, various modifications may be made in the specific expedients described as these are illustrative only.

We claim:

1. A salt of penicillin and α-phenyl-β-morpholinoethyl α-chloroacetate.

2. A salt of penicillin G and α-phenyl-β-morpholinoethyl α-chloroacetate.

3. A salt of penicillin O and α-phenyl-β-morpholinoethyl α-chloroacetate.

4. A salt of penicillin dihydro F and α-phenyl-β-morpholinoethyl α-chloroacetate.

References Cited in the file of this patent

UNITED STATES PATENTS

| Number | Name | Date |
|---|---|---|
| 2,547,640 | Goldman | Apr. 3, 1951 |
| 2,578,641 | Cooper | Dec. 11, 1951 |
| 2,598,508 | Cooper | May 27, 1952 |